(12) United States Patent
Wright

(10) Patent No.: US 8,398,864 B2
(45) Date of Patent: Mar. 19, 2013

(54) SCREENED DECANTER ASSEMBLY FOR A SETTLING TANK

(75) Inventor: Terry Wright, Rochester, NY (US)

(73) Assignee: Trans Terra Corporation, Rochester, NY (US)

( * ) Notice: Subject to any disclaimer, the term of this patent is extended or adjusted under 35 U.S.C. 154(b) by 434 days.

(21) Appl. No.: 12/691,028

(22) Filed: Jan. 21, 2010

(65) Prior Publication Data

US 2010/0140190 A1 Jun. 10, 2010

Related U.S. Application Data

(63) Continuation-in-part of application No. 12/177,553, filed on Jul. 22, 2008, now Pat. No. 7,972,505.

(51) Int. Cl.
*B01D 36/04* (2006.01)
*C02F 1/00* (2006.01)

(52) U.S. Cl. ... 210/776; 210/801; 210/804; 210/170.08; 210/295; 210/359

(58) Field of Classification Search ............ 210/122, 210/170.08, 295, 299, DIG. 5, 242.1, 359, 210/776, 137, 801, 804
See application file for complete search history.

(56) References Cited

U.S. PATENT DOCUMENTS

| | | | |
|---|---|---|---|
| 4,405,458 A * | 9/1983 | McHugh, Jr. ............... | 210/242.3 |
| 4,693,821 A | 9/1987 | Goronszy et al. | |
| 4,775,467 A | 10/1988 | Calltharp et al. | |
| 4,891,128 A | 1/1990 | Goronszy | |
| 5,149,344 A | 9/1992 | Macy | |
| 5,290,434 A * | 3/1994 | Richard ........................ | 210/109 |
| 5,435,924 A | 7/1995 | Albertson | |
| 5,503,747 A | 4/1996 | Vion et al. | |
| 5,587,067 A | 12/1996 | Love | |
| 6,773,593 B2 | 8/2004 | Young | |
| 7,025,888 B2 | 4/2006 | Thompson et al. | |
| 7,311,818 B1 | 12/2007 | Gurfinkel | |
| 2004/0069715 A1 * | 4/2004 | Stever et al. .................. | 210/747 |
| 2004/0074846 A1 | 4/2004 | Stever et al. | |
| 2006/0008865 A1 | 1/2006 | Cote et al. | |
| 2009/0236278 A1 | 9/2009 | Hoefken | |
| 2010/0018929 A1 | 1/2010 | Wright | |

FOREIGN PATENT DOCUMENTS

| | | |
|---|---|---|
| CN | 2873766 Y | 2/2007 |
| JP | 09276606 A | 10/1997 |
| JP | 2004-268005 A | 9/2004 |
| KR | 20-2000-0019921 U | 11/2000 |
| KR | 100406908 B1 | 11/2003 |

* cited by examiner

*Primary Examiner* — Duane Smith
*Assistant Examiner* — Paul J Durand
(74) *Attorney, Agent, or Firm* — Harris Beach PLLC; Neal L. Slifkin

(57) ABSTRACT

A driven decanter assembly for a wastewater primary treatment system, comprising a longitudinal decanter disposable in the wastewater and having a longitudinal trough and a horizontal entrance weir, a polygonal or arcuate screen attached to the decanter and having at least two screen surfaces disposable below the surface of the wastewater outside of the trough, and a floating baffle pivotably mounted to the decanter and disposable in the wastewater outside of the screen. The driven decanter assembly can directly replace a prior art driven decanter in any wastewater primary treatment system.

10 Claims, 3 Drawing Sheets

SCREENED DECANTER ASSEMBLY FOR A SETTLING TANK

CROSS-REFERENCE TO RELATED APPLICATIONS

The present application is a Continuation-In-Part of U.S. patent application Ser. No. 12/177,553, filed Jul. 22, 2008, now issued as U.S. Pat. No. 7,972,505.

FIELD OF THE INVENTION

The invention relates generally to the field of waste water treatment; more particularly, to settling tanks in wastewater treatment systems wherein grit and dense solids are allowed to settle from the influent and buoyant solids (fats, oil, grease, non-dense solids) are prevented by a floating baffle from entering into an effluent decanter or coming in contact with the decanter screen; and most particularly, to a driven decanter system comprising a self-backflushing screen.

BACKGROUND OF THE INVENTION

Waste water treatment systems used in the industry generally include, but are not limited to, the following treatment processes: grit removal, fine screening, flow equalization and primary clarification. The typical treatment processes are dependent on the velocity at which the waste water is moving through the system. Waste water, however, is not produced continually by humans, but instead is created in batch type processes, such as showering, flushing a toilet or operating a washing machine. Such water consumptive activities are generally repetitive resulting in daily, weekly, monthly and yearly diurnal flow patterns for a specific waste water treatment system.

Grit removal is generally performed in a grit chamber/channel which is velocity sensitive, having a required design velocity of 1.0 to 3.0 feet per second. The most common methods to remove grit are by reducing the velocity of the influent flow so that the grit settles out, or utilizing a circular channel/tank. The circular channel/tank is a hydro-cyclone that causes the grit to settle in a sump, separating the organics from the grit so that they can move forward to the biological processes. The grit is then pumped out of the sump to a grit washer and then discharged to a dumpster for disposal at a landfill. This technology is subject to a large variation in flows.

Fine screening is typically accomplished by placing a screen in an influent channel. The influent channel must have a minimum velocity of 1.25 feet per second to keep solids from settling out in the channel and a maximum velocity of 3.0 feet per second to keep solids from being forced through the screen. Such a flow is difficult to achieve due to the large variation in diurnal and pumped flow patterns.

Typical primary clarifiers are also velocity sensitive with the heavy solids going to the base of the clarifier where they are pumped to a digester, the floatable solids, grease and scum being trapped and skimmed off the surface and the neutral buoyant solids/clarified wastewater exits the basin via an effluent weir. Primary clarifiers are typically large tanks designed for gravity settling and may include electrical drives, flights and chains, rack arms and paddles or suction tubes, and sludge pumps.

Flow equalization typically occurs in a separate tank. The flow at the waste water plant is subject to travel times in the collection system, collection system design and pump station sizing. In general, larger collection systems use pump stations to lift the waste water to the treatment facility. The pumps are typically placed on variable-frequency drives in an attempt to provide a consistent uniform flow. The system of variable-frequency drives and pumps, however, fails in low and high flow conditions. The pumps must be designed for peak hourly flows and have minimum turn down capabilities.

These treatments and processes generally each require their own mechanical equipment and supporting infrastructure resulting in higher capital costs to develop the system, increased maintenance, and higher energy costs. Further, the necessary supporting infrastructure requires a large amount of space to develop a traditional waste water treatment system. Thus, there is a need to develop a waste water treatment system where the treatment processes are performed in a single tank, which uses less energy, requires fewer construction materials and less mechanical maintenance, and takes up less space, while at the same time offering improved BOD reduction and a uniform flow to downstream processes.

BRIEF SUMMARY OF THE INVENTION

The present invention provides a waste water treatment system including at least one sludge withdrawal hopper, a scum trough, Influent Feed System, an improved fine screen, and a discharge mechanism. The discharge mechanism comprises a driven decanter which operates on a pivot. The fine screen is attached directly to the intake (Decanter Box/Head) of the driven decanter. The height of the driven decanter is adjustable to match the actual effluent flow to a target flow, and also to self-backflush the screen.

BRIEF DESCRIPTION OF THE SEVERAL VIEWS OF THE DRAWINGS

The foregoing and other objects, features, and advantages of the invention will be apparent from the following more particular description of the embodiments of the invention.

DETAILED DESCRIPTION OF THE INVENTION

The present invention is a system for the primary treatment of waste water comprising an improved decanter assembly including a self-back-flushing screen arrangement.

Figure 1:
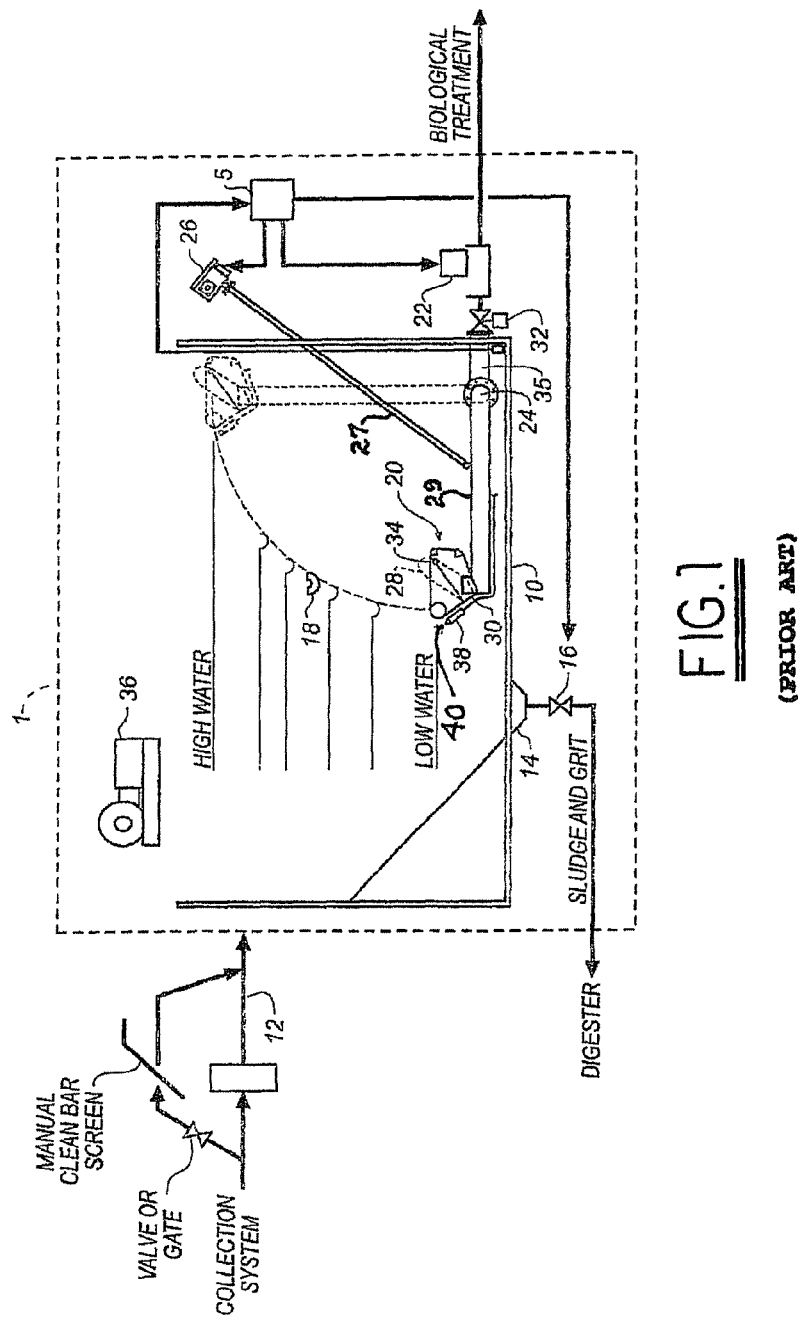
FIG. 1 is a schematic cross-sectional drawing of a prior art waste water primary treatment system including a prior art decanter assembly and prior art screen.

FIG. 1 is a schematic drawing of a prior art waste water primary treatment system, as disclosed in the parent patent application. The waste water treatment system 1 comprises a single primary settling tank 10 which receives waste water from a waste water collection system through an influent channel 12. The waste water treatment system 1 may also be used in other applications that benefit from an equalized flow into the waste water treatment processes, such as industrial batch discharges, stormwater, and septic receiving at a waste water treatment plant. Waste water reaches the waste water treatment system 1 as a result of gravity, the operation of pumps, or both. A coarse bar rack or fine screen may optionally be placed in the influent channel 12 to keep large inorganic solids from entering the waste water treatment system 1. Alternatively, a static or mechanical screen may be placed within the primary settling tank 10.

The primary settling tank 10 is sized based on the daily flow patterns for the collection system using generally known engineering practices. The size of the primary settling tank 10 is large compared to the influent channel 12 such that the velocity of the incoming flow decreases dramatically upon entrance of the water into the primary settling tank 10. The primary settling tank 10 is, however, shallow to provide for large surface overflow for improved settling and to maintain thinner side walls which decreases concrete costs.

The primary settling tank 10 is designed to have solids settle out in the tank based on the low velocity and the large cross-sectional area. At least one sludge hopper 14 is located at the bottom of the primary settling tank 10 to collect the settled sludge and grit. In further embodiments, multiple sludge hoppers may be used. The settled sludge and grit are removed from the sludge hopper 14 through a removal mechanism 16. The removal mechanism 16 may constitute either a draw, off pipe with an actuated valve to remove the settled sludge and grit using gravity. Alternatively, the removal mechanism 16 may constitute sludge pumps or airlifts to transport the settled sludge and grit to a higher elevation or over a long distance. The settled sludge and grit are then transported to a digester and are subsequently sent to a landfill for disposal. The removal mechanism 16 is operated through a main control panel 5, which provides a signal to start and stop the removal mechanism 16. Sludge and grit is removed from the sludge hopper 14 regularly to keep the solids from becoming septic or becoming compacted. The solid content of the sludge and grit may also be maintained around 3-4%, although in some applications the solid content of the primary sludge may go as high as 10%. The primary settling tank 10 further includes a scum trough 18 which collects scum and grease. The position of the scum trough 18 may be determined by the equalization volume of the primary settling tank 12. The collected scum and grease are then pumped to a digester.

The waste water flows from the primary settling tank 10 through a discharge mechanism, which controls the effluent flow. The discharge mechanism is a driven decanter 20. A flow measurement device 22 is located on the discharge side of the primary settling tank 10 to measure the rate of the effluent flow. The flow measurement device 22 may be an electronic flow meter such as a mag meter (enclosed pipe), a parshall flume with an ultrasonic level sensor, a V-notched weir with an ultrasonic level sensor, a pressure transducer, or any other device capable of measuring the rate of the effluent flow. The flow measurement device 22 provides a signal to a main control panel 5. A target flow based on engineering design or operational experience is entered in the main control panel 5. The main control panel 5 controls the discharge mechanism, such as the driven decanter 20 in FIG. 1, to adjust the amount of effluent that is allowed to travel through the discharge mechanism to cause the actual effluent flow rate as measured by the flow measurement device 22 to match a target flow rate, to maintain a uniform discharge flow from the primary settling tank 10 to downstream processes such as aeration tanks, secondary clarifiers, sand filters, disinfection and post aeration equipment.

The driven decanter 20 operates on a pivot 24 and is driven by a motor 26 and control shaft 27 pivotably attached to pivotable decant arm 29. The motor 26 may be a standard motor, a motor with an indexing drive, or a motor with a variable frequency drive to vary the rate of vertical movement of the driven decanter 20. The drive has reversing capabilities so that the driven decanter 20 can be raised or lowered in the primary settling tank 10. In one embodiment, the driven decanter. 20 may be designed to have a maximum height of one foot below the wall of the primary settling tank 10 to provide an automatic overflow. The driven decanter 20 is controlled by the main control panel 5. A target flow based on engineering design or operational experience is entered in the main control panel 5. The flow measurement device 22 provides the main control panel 5 with the actual effluent flow from the primary settling tank 10. The main control panel 5 sends a signal to the motor 26 to raise and lower the decanter 20 to match the actual flow to the target flow. As the decanter 20 is lowered, a larger portion of the intake is submerged, increasing the actual flow. Conversely, as the decanter 20 is raised, a smaller portion of the intake is submerged, decreasing the actual flow.

A fine screen 28 is located at the intake of the driven decanter 20. In one embodiment, a floating baffle 30 may be used to keep grease and scum from fouling the fine screen 28. The effluent flow from the primary settling tank 10 must pass through the fine screen 28 prior to entering the downstream processes, providing a physical barrier to keep solids larger than the screen openings from entering the downstream processes. The fine screen 28 allows the primary settling tank 10 to be smaller in size because the fine screen 28 prevents neutrally buoyant solids from exiting the primary settling tank 10. Thus, the primary settling tank 10 does not have to be sized to create settling velocities low enough to remove those neutrally buoyant solids. The openings in the fine screen 28 may be approximately 0.2 mm to 5.0 mm to keep as much of the organic solids in the primary settling tank as possible without nuisance fouling, although additional opening sizes may be applicable for other applications. Advancements in screening materials may allow for smaller opening sizes and/or better hydraulic flow characteristics. Such advancements will be incorporated to best suit the application.

Although the low velocities in the primary settling tank 10 should prevent significant fouling, the fine screen 28 may experience some fouling under certain circumstances. A cleaning system may be provided to remove fouling substances from the fine screen 28. The cleaning system may be automatically initiated by the main control panel 5 when the headloss through the fine screen 28 becomes too great, or may be set to occur at a regular interval.

In the embodiment shown in FIG. 1, as the portion of the fine screen 28 in contact with the liquid becomes fouled, the driven decanter 20 is lowered to increase the non-fouled screen surface area to increase the flow rate to match the target flow rate. Prior to the entire fine screen 28 becoming fouled, a contact switch 34 will send a signal to the main control panel 5 to initiate the cleaning system. The cleaning system may constitute water jets which discharge from the inside of the driven decanter 20 outwards to displace the fouling substance. Alternatively, an actuated valve 32 may be located on the discharge pipe 35. The actuated valve 32 may be closed and compressed air, potable, or non-potable water may be forced into the discharge pipe 35 to force screened water back through the fine screen 28 to remove the fouling substance.

In a further embodiment, a water jet 38 runs along the length of the driven decanter 20. The water jet 38 has a small discharge opening 40 which allows for a low flow with high velocity. The water jet 38 creates a counter current to the flow through the fine screen 28. The counter current forces solids having surface area and low mass away from the fine screen 28, allowing liquid and particles of small surface area to pass through to the fine screen 28. The action of the water jet 38 will cause turbulence that will dislodge solids and reduce matting of solids on the surface of the fine screen 28. The water jet 38 reduces the number of necessary cycles of the cleaning system by decreasing the fouling of the fine screen 28.

In some instances, such as where there are long forcemains and the waste water may become septic prior to reaching the waster water treatment system 1 it is advantageous to provide an aeration system 36 (diffusers mounted to tank base are not shown for clarity) to aerate the waste water in the primary settling tank 10. In this application, aeration to the primary settling tank 10 would be cycled to allow solids to settle periodically. The fine screen 28 prevents the turbulence resulting from aeration from affecting the solids retention performance. The main control panel 5 would be integrated with activation of the air blower 36 based on water depth and sludge settling.

Figure 2:
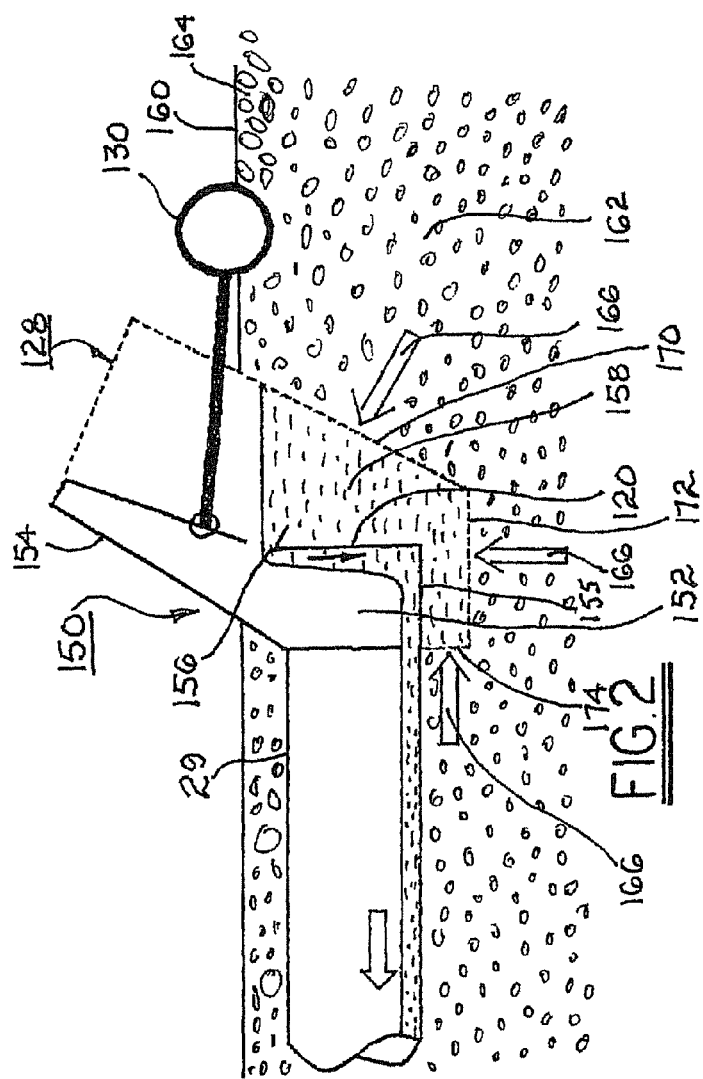
FIG. 2 is a schematic cross-sectional drawing of a first embodiment of an improved decanter and screen in accordance with the present invention for use in a waste water primary treatment system.
Figure 3:
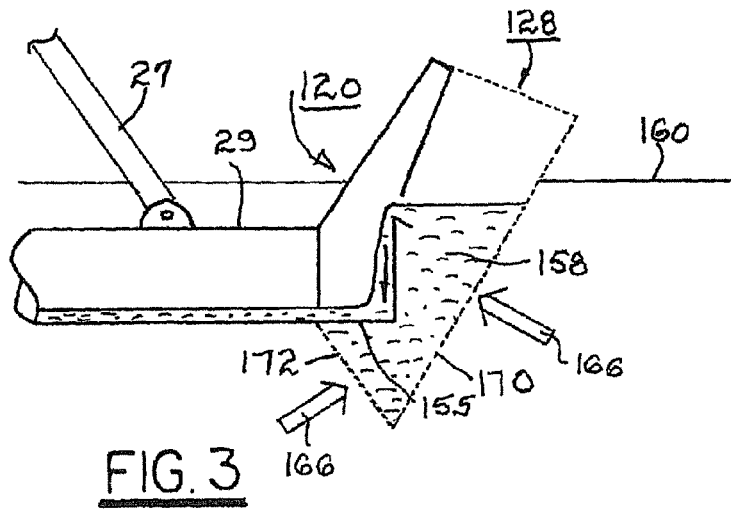
FIG. 3 is a schematic cross-sectional drawing of a second embodiment in accordance with the present invention (floating baffle omitted for clarity)
Figure 4:
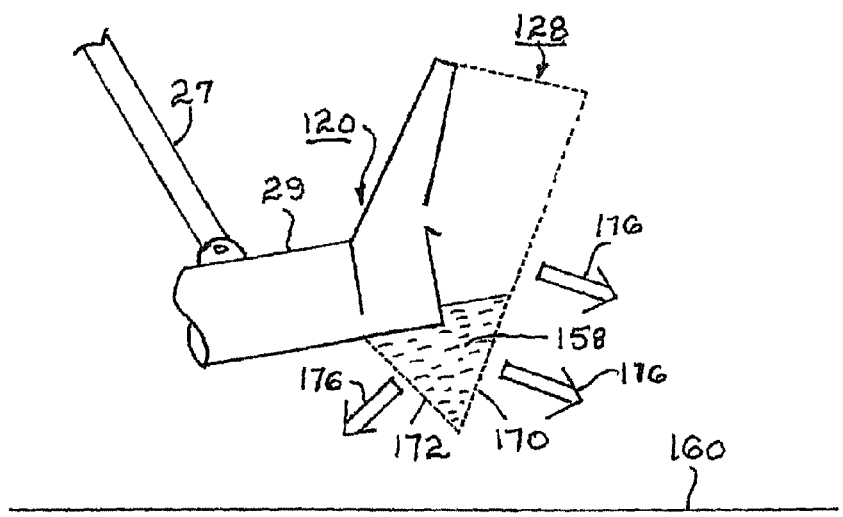
FIG. 4 is a schematic cross-sectional drawing showing the self-backflushing feature of the invention (floating baffle omitted for clarity).

Referring now to FIGS. 2 through 4, and with reference to FIG. 1, an improved and simplified driven decanter assembly 120 can directly replace driven decanter 20 in prior art waste water treatment system 1 or in any other waste water primary treatment system. (Note: in the following description, those improved components shown in FIGS. 2 through 4 that are analogous to prior art components shown in FIG. 1 carry the prior art number plus 100; new reference numbers begin at 150.)

Decanter assembly 150 comprises a decanter 120 having an elongated trough 152 and hood 154 attached to decant arm 29 as in the prior art. An improved screen 128 encloses decanter 120, as described more fully below. Trough 152 includes a horizontal weir 156 over which screened effluent 158 must enter trough 152 and flow into decant arm 29. A floating baffle 130 is pivotably mounted to hood 154 surrounding screen 128 and floats on the surface 160 of the undifferentiated effluent; thus all liquid 162 to pass through screen 128 must pass under floating baffle 130 which keeps floating components 164 of effluent 162 from coming into contact with screen 128. This is necessary because floatables 164 such as fats, oils, and greases can fill and thereby plug the openings in screen 128. In operating mode, liquid 162 is urged by gravity through screen 128 in direction 166, thereby removing fine particles from the liquid to create screened effluent 158.

Screen 128 is attached to decanter 122 in a manner to seal all the edges of the decanter such that no liquid may reach weir 156 without passing through screen 128. Preferably, screen 128 is readily removable from decanter 120 for physical or chemical cleaning as may be needed from time to time.

Screen 128 is attached to hood 154 and to decanter 120 in such a fashion as to create a relatively large screen surface. Screen 128 is polygonal or arcuate in cross-sectional profile and extends well below the operating surface 160 of the effluent and below the bottom 155 of decanter 120. Thus, effluent 158 may be screened on at least two sides 170,172 (FIGS. 3 and 4) and preferably three sides 170,172,174 (FIG. 2) of polygonal screen 128, or over a broad arcuate surface of an arcuate screen 128 (not shown). The large screen surface in contact with effluent 162 reduces the resulting velocity of liquid passing through the screen. This is an important aspect of the invention in that higher velocities will transport more solids to the screen face thus causing the screen to foul more quickly. High liquid velocities are to be avoided as the force of liquid moving through the screen can hold solids against the screen face, thus increasing headloss by blocking the openings in the screen. Further, solids can be forced into the openings in the screen, thus making subsequent removal of solids more difficult so that the screen can become completely fouled over time.

The mesh or opening size of screen 128 may be uniform or may be graded. In some applications, it is desirable to use a larger opening size in the upper portions of the screen not normally in contact with liquid 158. This is done to provide a screened overflow of a predetermined size and elevation. Fouling of the smaller openings in contact with screen 128 increases headloss, causing the level of surface 160 to rise and thus using additional screen surface. An increase in opening size begins at a predetermined height above decanter weir 156, in accordance with flow requirements of a particular application.

Referring to FIG. 4, the self-backflushing feature of screen 128 in accordance with the present invention is shown. Screen 128 is backflushed by raising decant arm 29 and decanter assembly 120 via control shaft 27 above surface 160 of the effluent. Previously-screened effluent 158 then flows by gravity through screen 128 in direction 176 opposite to direction 166, dislodging materials accumulated on the outside of screen 128. In some applications, weir 156 may be positioned nearer to the back wall of decanter 120 to increase the available purging volume of screened liquid 158 outside the decanter.

From the foregoing description, it will be apparent that there has been provided an improved decanter assembly including a self-backflushing screen for use in primary waste water treatment system. Variations and modifications of the herein described system, in accordance with the present invention, will undoubtedly suggest themselves to those skilled in this art. Accordingly, the foregoing description should be taken as illustrative and not in a limiting sense.

What is claimed is:

1. A decanter assembly for use in a primary treatment system for wastewater, comprising:
   a) a longitudinal decanter and hood disposable in said wastewater and having a longitudinal trough with a bottom and a horizontal entrance weir; and
   b) a screen having a cross-sectional profile selected from the group consisting of polygonal and arcuate, said screen being attached to said decanter and said hood on a manner to seal all the edges of said screen potentially below the level of said wastewater and having screen surfaces disposable above and below the surface of said wastewater outside of said trough and below said entrance weir and being off-spaced from said weir to form in use a closed pool of already screened wastewater resident between said screen and said weir.

2. A decanter assembly in accordance with claim 1 wherein said polygonal screen comprises a plurality of screen surfaces disposable below the surface of said wastewater.

3. A decanter assembly in accordance with claim 1 wherein the opening size in said screen is graded.

4. A decanter assembly in accordance with claim 1 wherein a first side of said screen is attached to said decanter at a point normally above the surface of said wastewater, and a second side of said screen is attached to the underside of said decanter.

5. A decanter assembly in accordance with claim 1 wherein said screen is detachable from said decanter.

6. A decanter assembly in accordance with claim 1 wherein said screen extending below said entrance weir of said longitudinal decanter is configured in such a way that raising said decanter assembly above the surface of said wastewater allows said already screened wastewater resident between said screen and said weir to flow back through said screen under gravity.

7. A decanter assembly in accordance with claim 1, further comprising a floating baffle pivotably mounted to said decanter and disposable in said wastewater outside of said screen.

8. A primary treatment system, for wastewater, comprising:
   a) a settling tank; and
   b) a decanter assembly disposed in said settling tank, including,
   a longitudinal decanter disposable in said wastewater and having a longitudinal trough and a horizontal entrance weir,
   a screen having a cross-sectional profile selected from the group consisting of polygonal and arcuate, said screen being attached to said decanter along all screen edges potentially below the level of said wastewater and having screen surfaces disposable above and below the surface of said wastewater outside of said trough.

9. A primary treatment system for wastewater in accordance with claim 8, wherein said decanter assembly further comprises a floating baffle pivotably mounted to said decanter and disposable in said wastewater outside of said screen.

10. A method for backflushing a decanter screen in a decanter assembly disposed in a primary treatment system for wastewater, wherein said screen, being attached to a decanter and hood of said decanter assembly at all edges of said screen potentially below the level of said wastewater, functions to remove solids from solids-laden wastewater by allowing wastewater liquid through said screen in a first direction to create a closed pool of screened wastewater between said screen and a weir of said decanter and stopping said solids on a first surface of said screen, the method comprising the steps of:
   a) raising said decanter assembly above the surface of said wastewater; and
   b) allowing said pool of screened wastewater to flow by gravity through said screen in a second direction opposite to said first direction to dislodge said solids from said first surface.

* * * * *